Patented Apr. 9, 1929.

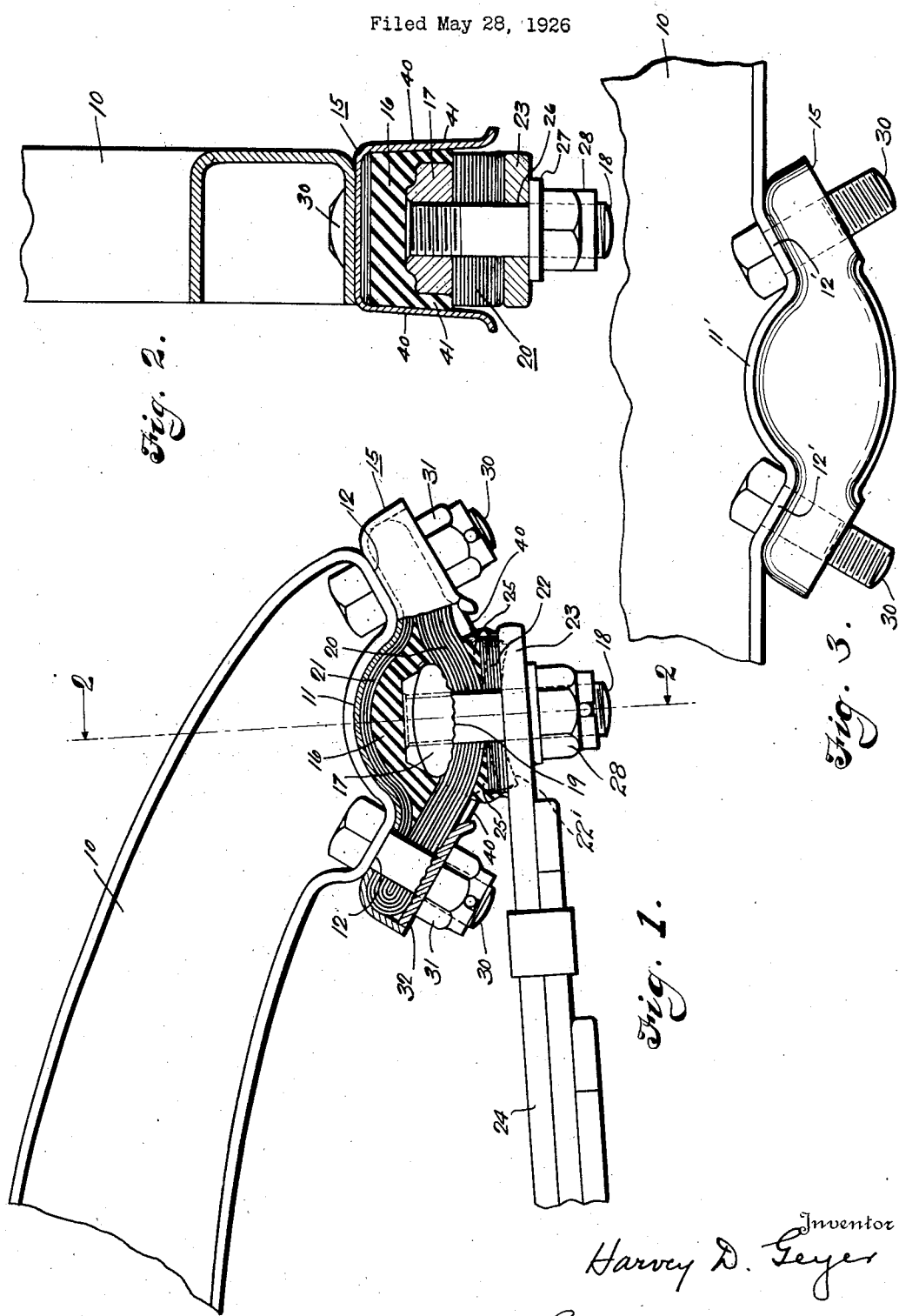

1,708,220

UNITED STATES PATENT OFFICE.

HARVEY D. GEYER, OF DAYTON, OHIO, ASSIGNOR TO THE INLAND MANUFACTURING COMPANY, OF DAYTON, OHIO, A CORPORATION OF DELAWARE.

SPRING SHACKLE.

Application filed May 28, 1926. Serial No. 112,261.

This invention relates to non-metallic connections interposed between two metallic parts of a vehicle, and has particular reference to shackles connecting the springs and chassis frame of a motor vehicle.

An object of this invention is to provide an efficient form of non-metallic pivot shackle which requires no costly fittings for attachment to the spring or chassis frame and is economical to manufacture.

An important feature of the shackle of this invention is that it permits free pivoting of the spring end, yet prevents any objectionable lateral movement or "side sway" of the chassis frame.

Another important feature is that it transmits tractive forces in either direction.

Further objects and advantages of the present invention will be apparent from the following description, reference being had to the accompanying drawings, wherein a preferred form of the present invention is clearly shown.

In the drawings:

Fig. 1 is a view showing a shackle built according to this invention, connecting the front end of the chassis frame of an automobile to the front end of the front spring. A portion of the shackle is shown in section, showing the interior construction.

Fig. 2 is a section on line 2—2 of Fig. 1.

Fig. 3 illustrates how the shackle of Figs. 1 and 2 can be attached to the chassis side channel when mounted on the front end of the rear spring. The view shows the metal housing and bolts in place, ready for the insertion of the molded shackle member.

Similar reference characters refer to similar parts throughout the several views of the drawings.

Numeral 10 designates the front portion of one of the chassis frame side channels, having its front end formed into a concave seat 11 with angularly positioned flat portions 12 on the fore and aft ends of the seat 11. A pressed metal housing 15, having an open lower side and its upper side conforming to the shape of the concave seat 11 and the flat portions 12, fits snugly up against the bottom of the side channel 10.

Within the housing 15 there is inserted a molded unit which comprises a flexible rubber block 16 having a metal insert 17 threaded to the stud 18, and a heavy flexible rubberized fabric web 20 all molded together to the form substantially as shown. The flexible web 20 preferably consists, primarily, of layers of strong cord fabric, with the cords thereof running longitudinally of the web, with sufficient layers of woven fabric interposed therein to prevent lateral separation of the cords when the shackle is in use. It is desirable that web 20 be as flexible as possible, consistent with the required tensile strength and, hence, the thickness of web 20 is determined by these considerations. Preferably a thin web of fabric 21 extends around the upper surface of the flexible rubber block 16, as clearly shown. The fabric layers of the web 21 are shown in Fig. 1 as being continuous with the outer layers of the fabric web 20. The lower corrugated surface 19 of the metal insert 17 is of substantial area and is slightly convex to give an easy bend to the fabric web 20 against which it is firmly clamped by the stud 18. Beneath the central portion of web 20 there is molded a rubberized fabric seat 22 against which the end 23 of the long spring leaf 24 is clamped. Preferably this seat 22 is molded in concave form with its fore and aft ends extending downwardly as clearly shown by dotted lines 22' in Fig. 1. This causes the edges of the seat 22 to hug closely to the upper surface of the spring leaf when the seat 22 is flattened out by drawing up the nut 28 on the stud 18 to firmly clamp the central portion of the fabric web 20 to the end 23 of the spring as clearly shown in full lines in Fig. 1. The tapered spaces between the flexible web 20 and the fabric seat 22 are filled with flexible rubber 25 which provides a cushion seat for the web 20 and also prevents mud, water, etc., from entering these spaces and yet permits the easy flexing of the flexible web 20. Preferably the rubber portions 25 extend around the edges of the fabric seat 22 and thus more completely protect it from dirt, water, etc.

The molded unit above described is inserted within the metal housing 15 and both the housing and molded unit are rigidly clamped to the frame channel 10 by the two throughbolts 30 and nuts 31. The corrugated clamping plates 32 extend laterally the full width of the web 20 and serve to securely fix the ends of this flexible web 20 to the channel 10 so that tractive forces can be safely transmitted between the channel 10 and spring 24 by the tension in the web 20.

The molded unit having been thus fixed in place, the lower end of stud 18 is next passed through a corresponding hole 26 in the spring end 23 and the lock washer 27 and nut 28 applied. By screwing nut 28 home, the central portion of the flexible web 20 is firmly secured to the spring end 23.

In operation, the weight of the vehicle body will put the rubber block 16 under compression, but the side walls 40 of housing 15 will confine the flexible rubber 16 laterally, as clearly shown in Fig. 2, and so substantially prevent any flow of the rubber. Preferably the side walls 40 continue downwardly to overlap the flexible web 20, but flare outwardly from the web 20 to practically clear same so that there will be no rubbing of web 20 upon the side walls 40 during pivoting movement of the shackle. The spring 24 may easily pivot through quite an angle by flexing the web 20 and by slightly distorting the block 16 within the interior thereof to permit a slight rolling of the insert 17. This insert 17 has its ends spaced from the side walls 40 so that the rubber within this space may yield internally to permit relative motion between the metal parts 17 and 40 without relative slipping between the rubber and either of these metal parts.

Fig. 1 illustrates the end 23 of the spring in up position, showing a slight reverse curvature in the forward end of the flexible web 20.

Fig. 3 illustrates how the shackle above described may be applied to the front end of the rear spring of an automobile. The concave seat 11' and the two angularly positioned flat portions 12' are formed in the bottom flange of the side channel 10. When applied to the rear spring the fabric web 20 transmits the tractive effort of the Hotchkiss type drive, as will be readily understood. During the application of wheel brakes the forward portion of the flexible web 20 is put under tension in the case of both front and rear springs, if both front and rear wheels have brakes.

While the form of embodiment of the invention as herein disclosed, constitutes a preferred form, it is to be understood that other forms might be adopted, all coming within the scope of the claims which follow.

What is claimed is as follows:

1. In combination with the spring and frame of a motor vehicle, a pivot shackle comprising: a metal housing fixed to said frame, a molded flexible rubber element confined by said housing and having a flexible fabric link molded therein, said link being secured at its fore and aft ends to said frame, and means for clamping the central portion of said link to said spring.

2. In combination with the spring and frame of a motor vehicle, a pivot shackle comprising: a flexible fabric link having its intermediate portion spaced from said frame but fixed at its fore and aft ends to said frame and having its intermediate portion fixed to said spring, a flexible rubber block located between the upper surface of said fabric link and said frame, and a metal housing confining the side walls of said block to limit the lateral bulging of said block.

3. In combination with the spring and frame of a motor vehicle, a pivot shackle comprising: a flexible fabric link having its intermediate portion spaced from said frame but fixed at its fore and aft ends to said frame and having its intermediate portion fixed to said spring, a rubber block completely filling the opening between the upper surface of said fabric link and said frame, and a metal housing confining the side walls of said block to limit the lateral bulging of said block.

4. In combination with the spring and frame of a motor vehicle, a pivot shackle comprising: a flexible fabric link having its intermediate portion spaced from said frame but fixed at its fore and aft ends to said frame and having its intermediate portion fixed to said spring, and a rubber block completely filling the opening between the upper surface of said fabric link and said frame.

5. In combination with the spring and frame of a motor vehicle, a pivot shackle comprising: a flexible fabric link having its intermediate portion spaced from said frame but fixed at its fore and aft ends to said frame and having its intermediate portion fixed to said spring, and a rubber block completely filling the opening between the upper surface of said fabric link and said frame, said block being vulcanized to said fabric link.

6. The combination with a vehicle frame member and a supporting spring member, of a coupling between the spring and frame members comprising: a flexible fabric link fixed at its end portions to one of said members and having its intermediate portion spaced therefrom and attached to the second of said members, and a flexible rubber block filling the opening between said fabric link and first member.

7. The combination with a vehicle frame member and a supporting spring member, of a coupling between the spring and frame members comprising: a flexible fabric link fixed at its end portions to one of said members and having its intermediate portion spaced therefrom and attached to the second of said members, and a flexible rubber block filling the opening between said fabric link and first member, said fabric link being bonded to said rubber block.

8. The combination with a vehicle frame member and a supporting spring member, of a coupling between the spring and frame members comprising: a flexible fabric link fixed at its end portions to one of said members and having its intermediate portion spaced therefrom and attached to the second of said members, a rubber block located between said link and said first member, and a housing confining the side walls of said block to limit the lateral distortion of said block.

9. The combination with a vehicle frame member and a supporting spring member, of a coupling between the spring and frame members comprising: a flexible fabric link fixed at its end portions to one of said members and having its intermediate portion spaced therefrom and attached to the second of said members, a rubber block filling the opening between said fabric link and said first member, and side walls rigid with said first member confining said rubber block laterally.

10. The combination with a vehicle frame member and a supporting spring member, of a coupling between the spring and frame members comprising: a flexible link comprising a plurality of layers of longitudinally-extending cords isolated by flexible rubber, said link being clamped at its fore and aft ends to one of said members and having its intermediate portion spaced therefrom and attached to the second of said members, and a flexible rubber block in the opening between said link and first member and yieldably urging said link spaced from said first member.

11. In combination with the spring and frame of a vehicle, a shackle comprising: a molded flexible rubber element having a flexible fabric link molded therein, said element being secured at its upper side to said frame, an integrally molded rubber and fabric seat member interposed between the central portion of said flexible link and the spring, and a metal insert having a shank extending through said fabric seat for clamping the central portion of said link down upon said spring.

12. In combination with the spring and frame of a vehicle, a shackle comprising: a molded flexible rubber element having a flexible fabric link molded therein, said element being secured at its upper side to said frame, a rubberized fabric seat member molded integral with said rubber and fabric element at its lower central portion, said seat member being molded with a concave lower surface, and a metal clamping insert molded within said element and having a shank extending downwardly through said fabric seat member for clamping the lower side of said element down upon said spring.

In testimony whereof I hereto affix my signature.

HARVEY D. GEYER.